US012679185B2

(12) United States Patent
    Grass

(10) Patent No.: US 12,679,185 B2
(45) Date of Patent: Jul. 14, 2026

(54) SENSOR UNIT FOR CONTACTLESSLY ACTUATING A VEHICLE ELEMENT

(71) Applicant: Vitesco Technologies GmbH, Regensburg (DE)

(72) Inventor: Philippe Grass, Regensburg (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 362 days.

(21) Appl. No.: 18/551,512

(22) PCT Filed: Mar. 28, 2022

(86) PCT No.: PCT/EP2022/058088
    § 371 (c)(1),
    (2) Date: Sep. 20, 2023

(87) PCT Pub. No.: WO2022/214345
    PCT Pub. Date: Oct. 13, 2022

(65) Prior Publication Data
    US 2024/0174060 A1      May 30, 2024

(30) Foreign Application Priority Data
    Apr. 6, 2021    (DE) ..................... 10 2021 203 384.9

(51) Int. Cl.
    *B60R 11/00*        (2006.01)
    *B60J 5/10*         (2006.01)
    (Continued)
(52) U.S. Cl.
    CPC .............. *B60J 5/101* (2013.01); *B60R 11/00* (2013.01); *G01S 13/422* (2013.01); *G01S 13/88* (2013.01);
    (Continued)

(58) Field of Classification Search
    None
    See application file for complete search history.

(56) References Cited

U.S. PATENT DOCUMENTS 9,162,685 B2  10/2015  Schindler et al.
9,290,982 B2   3/2016  Schuetz et al.
           (Continued)

FOREIGN PATENT DOCUMENTS

DE    102012212418 A1   1/2014   ............. B60R 16/02
DE    102013110296 A1   1/2015   ............. B60R 16/02
           (Continued)

OTHER PUBLICATIONS

German Office Action, Application No. 102021203384.9, 7 pages, Feb. 4, 2022.

(Continued)

*Primary Examiner* — Daniel L Greene
*Assistant Examiner* — Robert L Pinkerton
(74) *Attorney, Agent, or Firm* — Slayden Grubert Beard PLLC

(57)          ABSTRACT

Various embodiments of the teachings herein include a sensor unit for a contactless actuator of an adjustable vehicle element. The sensor unit may include: a carrier element for mounting to a vehicle; a first sensor device attached to the carrier element and having a first capturing area; and a second sensor device attached to the carrier element and having a second capturing area. When mounted on the vehicle, the first sensor device is arranged closer to a floor of the vehicle than the second sensor device; and the first capturing area extends further back with respect to a forward direction of travel of the vehicle than the second capturing area.

11 Claims, 1 Drawing Sheet

(51) Int. Cl.
*G01S 13/42* (2006.01)
*G01S 13/88* (2006.01)

(52) U.S. Cl.
CPC ... *B60R 2011/004* (2013.01); *B60R 2011/005* (2013.01)

(56) References Cited

U.S. PATENT DOCUMENTS

| | | | |
|---|---|---|---|
| 9,573,565 B2 | 2/2017 | Schindler et al. | |
| 9,834,175 B2 | 12/2017 | Tokudome et al. | |
| 9,919,648 B1 * | 3/2018 | Pedersen .......... | G08G 1/096716 |
| 9,927,520 B1 * | 3/2018 | Ward ..................... | G01S 15/93 |
| 2006/0022043 A1 * | 2/2006 | Smets ................... | G06K 17/00 |
| | | | 235/451 |
| 2012/0123649 A1 * | 5/2012 | Eggers ................... | B60R 13/07 |
| | | | 701/49 |
| 2013/0234828 A1 * | 9/2013 | Holzberg ............... | B60R 25/01 |
| | | | 340/5.72 |
| 2017/0285209 A1 * | 10/2017 | Pirchheim ........... | B60R 25/2054 |
| 2021/0148144 A1 * | 5/2021 | Schatz ................. | B60R 25/246 |
| 2021/0246708 A1 | 8/2021 | Mönig ................... | E05F 15/73 |

FOREIGN PATENT DOCUMENTS

| | | | | |
|---|---|---|---|---|
| DE | 102017205646 A1 | 10/2018 | .............. | H05K 5/02 |
| DE | 10 2018 115 581 | 1/2020 | ............. | E05F 15/70 |
| JP | 6533759 B2 | 6/2019 | ............... | B60J 5/04 |
| WO | 2022/214345 A1 | 10/2022 | .......... | H03K 17/945 |

OTHER PUBLICATIONS

Search Report for International Application No. PCT/EP2022/058088, 10 pages, Jun. 29, 2022.

\* cited by examiner

SENSOR UNIT FOR CONTACTLESSLY ACTUATING A VEHICLE ELEMENT

CROSS-REFERENCE TO RELATED APPLICATIONS

This application is a U.S. National Stage Application of International Application No. PCT/EP2022/058088 filed Mar. 28, 2022, which designates the United States of America, and claims priority to DE Application No. 10 2021 203 384.9 filed Apr. 6, 2021, the contents of which are hereby incorporated by reference in their entirety.

TECHNICAL FIELD

The present disclosure relates to sensors. Various embodiments of the teachings herein include sensor units for contactlessly actuating an adjustable vehicle element, vehicle components, and/or vehicles.

BACKGROUND

Modern vehicles are often equipped with sensors which allow contactless adjustment of vehicle doors. For example, a vehicle user is enabled to contactlessly actuate (that is to say open or close) a vehicle door. Sensors of this type are for example provided in the case of motor-adjustable liftgates of motor vehicles, wherein the vehicle user can cause an opening or closing of the liftgate by means of a corresponding leg movement without having to put down a load which is held in their hands.

Capacitively operating proximity sensors are often used to detect an actuation command. A capacitive proximity sensor of this type typically comprises a number of electronic components, particularly one or more for the most part elongate sensor electrodes and an electronic unit which is connected to the sensor electrodes via associated supply lines in each case. However, the use of radar sensors is also known for contactlessly capturing an actuation command. Sensor units and/or sensors of this type are known for example from U.S. Pat. Nos. 9,290,982 B2, 9,162,685 B2, DE 10 2017 205 646 A1, JP 6 533 759 B2 and U.S. Pat. No. 9,834,175 B2.

SUMMARY

The teachings of the present disclosure include sensor units for contactlessly actuating an adjustable vehicle element, which can be used independently of a vehicle part and the coating thereof. For example, some embodiments include a sensor unit (200) for contactlessly actuating an adjustable vehicle element, wherein the sensor unit (200) is designed to be attached to a vehicle, wherein the sensor unit (200) has: a carrier element (210) for mounting on the vehicle, a first sensor device (220) having a first capturing area (226), which is attached to the carrier element (210), and a second sensor device (230) having a second capturing area (236), which is attached to the carrier element (210), wherein, in a mounted state of the sensor unit (210) on the vehicle, the first sensor device (220) is arranged closer to the floor than the second sensor device (230), and wherein, in a mounted state of the sensor unit (210) on the vehicle, the first capturing area (226) extends further back with respect to the forward direction of travel (12) of the vehicle than the second capturing area (236).

In some embodiments, the first sensor device (220) and the second sensor device (230) are arranged on the carrier element (210) in such a manner that the first capturing area (226) and the second capturing area (236) at least partially overlap.

In some embodiments, the first sensor device (220) has a radar sensor for sending and receiving a first radar signal, and/or the second sensor device (230) has a radar sensor for sending and receiving a second radar signal.

In some embodiments, the first capturing area (226) is substantially conical, and/or the second capturing area (236) is substantially conical.

In some embodiments, in a mounted state of the sensor unit (200) on the vehicle, the first sensor device (220) is arranged further forward in the forward direction of travel (12) of the vehicle than the second sensor device (230).

As another example, some embodiments include a vehicle component for a vehicle, having: a vehicle part (10), which is at least partially coated with a coating (12) on an outer side, and a sensor unit (200) as claimed in of the preceding claims, which is arranged opposite with respect to the outer side of the vehicle part (10), wherein the first sensor device (220) is arranged on the carrier element (210) in such a manner that the first sensor area (226) extends through the vehicle part (10), substantially past the coating (12).

In some embodiments, the first sensor area (226) extends through the vehicle part (10), substantially below the coating (12) and past the same.

In some embodiments, the vehicle part (10) is a rear bumper of the vehicle, and/or the coating (12) is a chrome coating.

In some embodiments, a vehicle includes one or more vehicle parts as described herein, an adjustable vehicle element, a drive unit, which is designed to open or to close the adjustable vehicle element in relation to a vehicle bodywork, and a control unit, which is designed to control the drive unit to move the adjustable vehicle element based on a capturing event of the sensor unit (200).

In some embodiments, the adjustable vehicle element is a liftgate.

BRIEF DESCRIPTION OF THE DRAWINGS

Further objects and features of the teachings of the present disclosure are apparent to a person skilled in the art by putting the present teaching into practice and taking into consideration the accompanying drawings, in which.

DETAILED DESCRIPTION

Figures 1, 2:
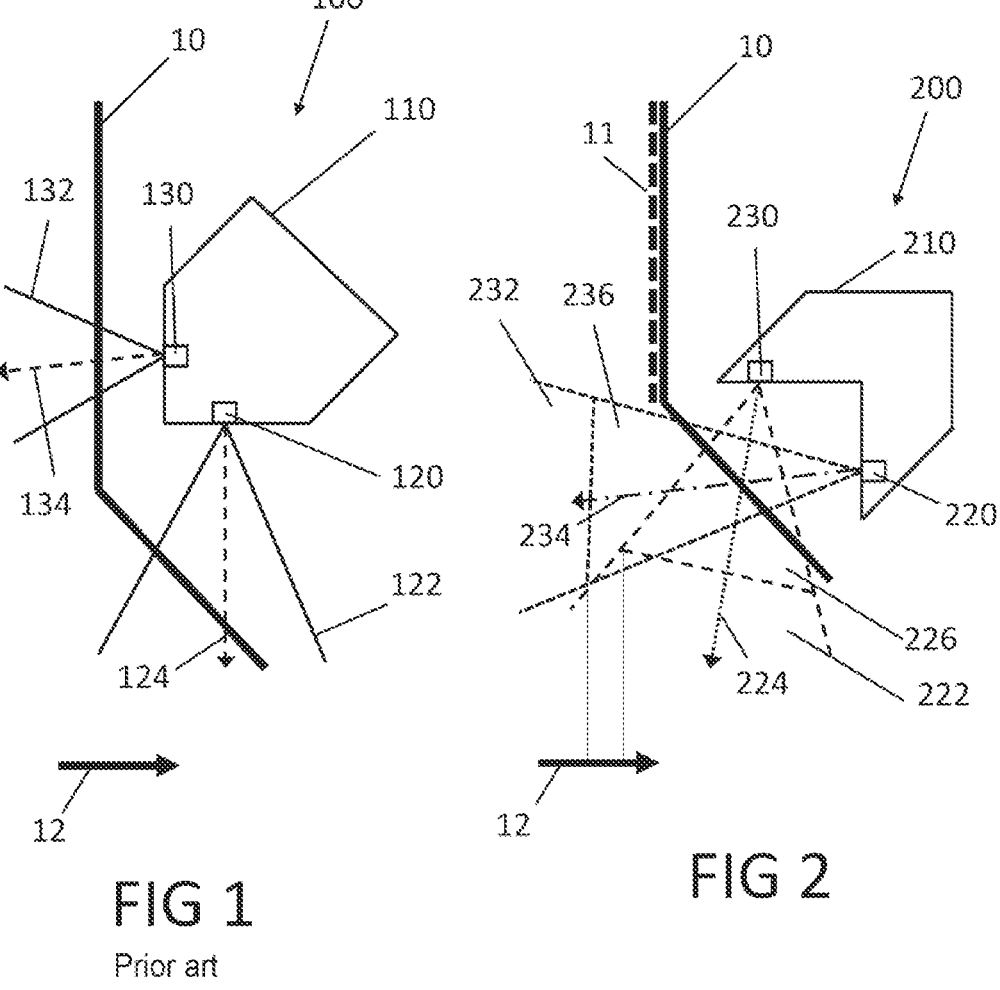
FIG. 1 shows a schematic view of a sensor unit known from the prior art for contactlessly actuating an adjustable vehicle element.
FIG. 2 shows a schematic view of a sensor unit incorporating teachings of the present disclosure for contactlessly actuating an adjustable vehicle element.

The teachings of the present disclosure include a sensor unit for contactlessly actuating a vehicle element, which has two sensor devices with two capturing areas. In this case, the capturing area of one of the two sensor devices extends further back with respect to the forward travel direction of the vehicle than the capturing area of the other sensor device. The sensor device having the capturing area which extends further back is arranged closer to the floor on the vehicle than the other sensor device. Therefore, it is possible to ensure that the sensor unit can be arranged on the vehicle independently of vehicle parts and any coatings on the same, such as a chrome coating for example, and the functionality of the sensor unit is not impaired. In particular, the sensor unit can be arranged on the vehicle closer to the floor than sensor units which are known in the prior art.

In some embodiments, a sensor unit for contactlessly actuating an adjustable vehicle element is designed to be attached to a vehicle. The sensor unit has a carrier element for mounting on the vehicle, a first sensor device having a first capturing area, which is attached to the carrier element, and a second sensor device having a second capturing area, which is attached to the carrier element. In a mounted state of the carrier element on the vehicle, the first sensor device is arranged closer to the floor than the second sensor device and that in a mounted state of the sensor unit on the vehicle, the first capturing area extends further back with respect to the forward direction of travel of the vehicle than the second capturing area.

The first sensor device has a first radiation area, which extends beyond the first capturing area, and/or the second sensor device has a second radiation area, which extends beyond the second capturing area. Therefore, the first capturing area describes the area of the first radiation area which is closest to the first sensor device and in which the first sensor device has its desired sensitivity. In a similar manner, the second capturing area describes the area of the second radiation area which is closest to the second sensor device and in which the second sensor device has its desired sensitivity.

The sensor unit is therefore attached to the vehicle in such a manner that the first sensor device, the first capturing area of which extends further back with respect to the forward direction of travel of the vehicle, is arranged closer to the floor, that is to say further down, than the second sensor device, the second capturing area of which does not extend so far back. Therefore, the entire sensor unit can be arranged lower on the vehicle, as a result of which it is made possible to arrange the sensor unit independently of the vehicle parts, particularly a coating applied on the vehicle part, and to ensure correct operation of the sensor unit.

In some embodiments, the first sensor device and the second sensor device are arranged on the carrier element in such a manner that the first capturing area and the second capturing area at least partially overlap. The carrier element may for example be a separate element, on which the first sensor device and the second sensor device are arranged. Thus, the sensor unit can be pre-mounted outside of the vehicle, in order to then be attached to the vehicle as a unit. In some embodiments, the carrier element may be a part of the vehicle, such as for example a part of the vehicle base or the vehicle bodywork, to which the first sensor device and the second sensor device can then be attached.

In some embodiments, the first sensor device has a radar sensor for sending and receiving a first radar signal and/or the second sensor device has a radar sensor for sending and receiving a second radar signal.

In some embodiments, the first capturing area is substantially conical and/or the second capturing area is substantially conical, wherein the first and second capturing directions run substantially as an axis of symmetry or rotation of the cone. In some embodiments, the first capturing area and/or the second capturing area may also have any other shape that is known from the prior art.

In some embodiments, in a mounted state of the sensor unit on the vehicle, the first sensor device is arranged further forward with respect to the forward direction of the vehicle than the second sensor device. Using such an arrangement of the two sensor devices relative to one another, it is possible to ensure that the two capturing areas of the two sensor devices can at least partially overlap.

In some embodiments, a vehicle component for a vehicle has a vehicle part, which is at least partially coated with a coating on an outer side, and a sensor unit as described herein, which is arranged opposite with respect to the outer side of the vehicle part. In this case, the first sensor device is arranged on the carrier element in such a manner that the first sensor area extends through the vehicle part, substantially past the coating. Thus, it is substantially possible to exclude that the coating of the vehicle part can negatively influence or impair the functionality of the sensor unit, particularly the first sensor device.

In some embodiments, the first sensor area extends through the vehicle part, substantially below the coating and past the same. Particularly for embodiments in which the sensor device can be actuated contactlessly by means of a leg and/or foot of a person, this has the advantage that, in spite of a coating on the vehicle part, the sensor unit can be attached low on the vehicle, in order to detect the leg movement reliably.

In some embodiments, the vehicle part is a rear bumper of the vehicle and/or the coating may be a chrome coating.

In some embodiments, a vehicle having a vehicle component as described herein is provided.

In some embodiments, the vehicle has an adjustable vehicle element, a drive unit, which is designed to open or to close the adjustable vehicle element in relation to a vehicle bodywork, and a control unit, which is designed to control the drive unit to move the adjustable vehicle element based on a capturing event of the sensor unit. A capturing event is for example a contactless actuation of the sensor unit by a part of the body of a person. For example, this may in this case be the movement of a leg through the first capturing area of the first sensor device and/or the second capturing area of the second sensor device.

In some embodiments, the adjustable vehicle element is a liftgate of the vehicle.

In the context of the present disclosure, the term "capturing area" describes an area of a radiation area of a sensor device, such as a sensor device based on the radar principle for example. In particular, the capturing area describes the area of the radiation area of the sensor device with the highest sensitivity. Consequently, the capturing area is a subset of the radiation area and therefore smaller in terms of volume than the radiation area. In particular, in the capturing area the ratio of useful signal to noise is sufficiently high, so an object for capture can be captured and detected.

FIG. 1 shows a schematic view of a sensor unit 100 known from the prior art for contactlessly actuating an adjustable vehicle element (not shown), such as a liftgate of a vehicle for example, which can move in the forward direction of travel 12. The known sensor unit 100 has a carrier element 110, to which a first sensor device 120 and a second sensor device 130 are attached. The carrier element 110 is designed to be permanently and/or releasably attached to a vehicle. In particular, the carrier element 110 is attached behind a vehicle part 10 of the vehicle in such a manner that a first radiation area 122 of the first sensor device 120 and a second radiation area 132 of the second sensor device 130 in each case extend outward through the vehicle part 10 into the surroundings of the vehicle.

The attachment of the carrier element 110 to the vehicle part 10 can optionally take place permanently or in a non-destructively removable manner. In this case, the vehicle part 10 can in principle be the vehicle element to be adjusted itself. Generally, however, the sensor unit is fastened to a different vehicle part 10. In a preferred embodiment of the invention, the vehicle element to be adjusted is a liftgate of the vehicle. In this case, the sensor unit 100 is preferably intended and set up for mounting on the rear bumper of the vehicle. Alternatively, the adjustable vehicle element may however also be a different vehicle part, for example a side door, particularly a sliding side door.

The carrier element 110 may for example be a separate element, on which the first sensor device 120 and the second sensor device 130 are arranged. Thus, the sensor unit 100 can be pre-mounted outside of the vehicle, in order to then be attached to the vehicle as a unit. Alternatively, the carrier element 110 may be a part of the vehicle, such as for example a part of the vehicle base or the vehicle bodywork, to which the first sensor device 120 and the second sensor device 130 can then be attached.

In the example shown in FIG. 1, the vehicle part 10 is a rear bumper of the vehicle. The shape of the bumper is not limited to the shape shown in FIG. 1 and may have any known shapes, as is known for bumpers in the prior art. According to other embodiments, the vehicle part may however also be the vehicle element.

As mentioned already, the first sensor device 120 has a first radiation area 122, which has a first capturing area 126, in which an object for capture, such as a leg and/or a foot of a person for example, can be captured. The first capturing area 126 of the first radiation area 122 extends substantially along a first capturing direction 124, which runs substantially in the horizontal direction. The first capturing direction 124 is defined in this case by the axis of symmetry or rotation of the three-dimensional first radiation area 122.

In a similar manner, the second sensor device 130 has the second radiation area 132, which has a second capturing area 136, in which the object for capture can be captured. The second radiation area 132 and the second capturing area 136 extend substantially along a second capturing direction 134, which runs substantially in the vertical direction. The second capturing direction 134 is defined in this case by the axis of symmetry or rotation of the three-dimensional second radiation area 122.

The capturing areas 126, 136 in this case respectively describe the areas of the associated radiation areas 122, 132 with the desired sensitivity. That is to say that the object for capture is first detected when it enters into the respective capturing area 126, 136.

By providing two sensor devices 120, 130 and consequently two separate capturing areas 122, 132, it is possible to ensure that a desired actuation of the vehicle element can be differentiated from an undesired actuation of the vehicle element. An undesired actuation of the vehicle element may for example be a passer-by walking past the vehicle and therefore the sensor unit 100, who only enters into the radiation areas 122, 132 or only one capturing area 126, 136.

In the case of the known sensor unit 100 shown in FIG. 1, the first sensor device 120 is arranged further up on the carrier element 110 than the second sensor device 130, which is consequently arranged closer to the floor than the first sensor device 120. In addition, as can be seen from FIG. 1, the two capturing areas 126, 136 of the sensor devices 120, 130 are arranged in a non-overlapping manner.

If the vehicle element 10 is coated with a coating on its outer side, the coating may for example be disadvantageous for the first capturing area 126 in that the first capturing area 126 can no longer radiate into the surroundings of the vehicle without difficulty, as the coating may be impenetrable for the first capturing area 122. The teachings of the present disclosure address this problem and offer a remedy.

FIG. 2 shows a sensor device 200 incorporating teachings of the present disclosure, which likewise has a carrier element 210 with sensor devices 220, 230 attached thereto. In contrast with the vehicle part 10 shown in FIG. 1, the vehicle part 10 shown in FIG. 2 is provided with a coating 11 on an outer side, such as a chrome coating for example. A coating 11 of this type may be impenetrable for the radiation areas 122, 132 and/or capturing areas 126, 136.

The first sensor device 220 is arranged closer to the floor than the second sensor device 230. That is to say, compared to the sensor unit 100 shown in FIG. 1, the positions of the sensor devices 220, 230 of the sensor unit 200 shown in FIG. 2 are reversed. In particular, the two sensor devices 220, 230 can be aligned in such a manner that the associated capturing areas 226, 236 at least partially overlap.

Due to the arrangement according to the invention of the capturing areas 226, 236 of the two sensor devices 220, 230, the carrier element 210 can be arranged further down, that is to say closer to the floor, relative to the vehicle element 10, so that the first capturing area 226 of the first sensor device 220 can extend through the vehicle part 10 past the coating 11 into the surroundings of the vehicle. In some embodiments, the first capturing area 226 extends below the coating 11 and past the same. Consequently, the negative interference of the coating 11 with the first capturing area 226 can be eliminated.

In some embodiments, the first sensor device 210 is arranged further forward with respect to the forward direction of travel of the vehicle than the second sensor device 230.

The first capturing area 226 extends further back with respect to the forward direction of travel 12 of the vehicle than the second capturing area 236. The vertical lines shown in FIG. 2 in this case show the rearmost positions of the two capturing areas 226, 236 in each case.

In some embodiments, the first sensor device 220 and/or the second sensor device 230 in each case has a radar sensor for sending and receiving a first and/or second radar signal. In some embodiments, the first and second capturing area 126, 136 are substantially conical in each case and, as already mentioned previously, extend outward through the vehicle element 110 along the directions of extent 224, 234 into the surroundings of the vehicle. In some embodiments, the radiation areas 222, 232 and/or capturing areas 226, 236 can also have any other three-dimensional shape.

Compared to the sensor unit 100 (see FIG. 1) known from the prior art, the positions of the first and second sensor devices 220, 230 are reversed in the sensor unit 200 (see FIG. 2). This makes it possible to achieve the advantage that the entire sensor unit 200, but particularly the sensor unit 220 having a capturing area 226, which extends further back, can be arranged lower on the vehicle, that is to say closer to the floor, than the second sensor device 230, in order therefore to make it past any coating 11 which is impenetrable for the first radiation area 222 and/or first capturing area 226.

What is claimed is:

1. A sensor unit for a contactless actuator of an adjustable vehicle element, the sensor unit comprising:

a carrier element for mounting to a vehicle;

a first sensor device attached to the carrier element and having a first capturing area; and a second sensor device attached to the carrier element and having a second capturing area;

wherein, when mounted on the vehicle, the first sensor device is arranged closer to a floor of the vehicle than the second sensor device; and the first capturing area extends further back with respect to a forward direction of travel of the vehicle than the second capturing area.

2. The sensor unit as claimed in claim 1, wherein the first capturing area and the second capturing area at least partially overlap.

3. The sensor unit as claimed in claim 1, wherein:
the first sensor device has a radar sensor for sending and receiving a first radar signal;
and/or
the second sensor device has a radar sensor for sending and receiving a second radar signal.

4. The sensor unit as claimed in claim 1, wherein
the first capturing area is substantially conical, and/or
the second capturing area is substantially conical.

5. The sensor unit as claimed in claim 1, wherein, when mounted on the vehicle, the first sensor device is arranged further forward in the forward direction of travel of the vehicle than the second sensor device.

6. A vehicle component for a vehicle, the component comprising:
a vehicle part at least partially coated with a coating on an outer side; and
a sensor unit arranged opposite with respect to the outer side of the vehicle part;
wherein the sensor unit comprises:
a carrier element for mounting to a vehicle;
a first sensor device attached to the carrier element and having a first capturing area; and
a second sensor device attached to the carrier element and having a second capturing area;
wherein, when mounted on the vehicle, the first sensor device is arranged closer to a floor of the vehicle than the second sensor device;
the first capturing area extends further back with respect to a forward direction of travel of the vehicle than the second capturing area; and
the first sensor area extends through the vehicle part past the coating.

7. The vehicle component as claimed in claim 6, wherein the first sensor area extends through the vehicle part below the coating.

8. The vehicle component as claimed in claim 6, wherein
the vehicle part comprises a rear bumper, and/or
the coating comprises chrome.

9. A vehicle having:
a passenger compartment;
a propulsion unit to move the vehicle;
a vehicle part at least partially coated with a coating (12) on an outer side; and
a sensor unit arranged opposite with respect to the outer side of the vehicle part;
wherein the sensor unit comprises:
a carrier element for mounting to a vehicle;
a first sensor device attached to the carrier element and having a first capturing area; and
a second sensor device attached to the carrier element and having a second capturing area;
wherein, when mounted on the vehicle, the first sensor device is arranged closer to a floor of the vehicle than the second sensor device;
the first capturing area extends further back with respect to a forward direction of travel of the vehicle than the second capturing area; and
the first sensor area extends through the vehicle part past the coating.

10. The vehicle as claimed in claim 9, further comprising:
an adjustable vehicle element;
a drive unit to open or to close the adjustable vehicle element in relation to a vehicle body; and
a control unit to control the drive unit to move the adjustable vehicle element based on a capturing event of the sensor unit.

11. The vehicle as claimed in claim 10, wherein the adjustable vehicle element comprises a liftgate.

* * * * *